(12) United States Patent
Foulger et al.

(10) Patent No.: US 6,317,540 B1
(45) Date of Patent: Nov. 13, 2001

(54) ENERGY CABLE WITH ELECTROCHEMICAL CHEMICAL ANALYTE SENSOR

(75) Inventors: Stephen H. Foulger, Lexington; James R. Curley, Columbia, both of SC (US)

(73) Assignee: Pirelli Cables & Systems, LLC, Lexington, SC (US)

( * ) Notice: Subject to any disclaimer, the term of this patent is extended or adjusted under 35 U.S.C. 154(b) by 0 days.

(21) Appl. No.: 09/497,070

(22) Filed: Feb. 2, 2000

(51) Int. Cl.[7] ........................................ G02B 6/44
(52) U.S. Cl. ..................... 385/100; 385/12; 324/555; 340/605
(58) Field of Search .................. 385/100, 12; 324/544, 324/557, 555, 693, 534; 340/605

(56) References Cited

U.S. PATENT DOCUMENTS

| | | | |
|---|---|---|---|
| 4,487,057 | * 12/1984 | Lutz ........................................ | 324/52 |
| 4,931,741 | 6/1990 | Koppitsch et al. ................... | 324/512 |
| 5,015,958 | 5/1991 | Masia et al. .......................... | 324/522 |
| 5,045,163 | 9/1991 | Nyberg et al. ..................... | 204/153.1 |
| 5,256,574 | 10/1993 | Neuburger et al. ................... | 436/143 |
| 5,417,100 | 5/1995 | Miller et al. .......................... | 73/31.2 |
| 5,546,004 | 8/1996 | Schmelz ................................. | 324/446 |
| 5,574,377 | 11/1996 | Marquez-Lucero et al. ........ | 324/533 |
| 5,672,297 | 9/1997 | Soane .................................... | 252/511 |
| 5,698,089 | 12/1997 | Lewis et al. .......................... | 205/787 |
| 5,889,396 | 3/1999 | Millot et al. ........................ | 324/71.1 |
| 6,197,219 | * 3/2001 | Foulger ................................ | 252/500 |

FOREIGN PATENT DOCUMENTS

| | | | |
|---|---|---|---|
| 8902073 | 8/1989 | (DE) | ............................... G01M/3/16 |
| 3908903 | 9/1990 | (DE) | ............................... H01B/7/32 |
| 0096095 | 12/1983 | (EP) | . |
| 558057A2 | 9/1993 | (EP) | ............................... G01M/3/16 |
| 726459A1 | 8/1996 | (EP) | ............................... G01N/27/12 |
| 2062246 | 5/1981 | (GB) | ............................... H01J/7/34 |

* cited by examiner

*Primary Examiner*—Darren Schuberg
*Assistant Examiner*—Leo Boutsikaris
(74) *Attorney, Agent, or Firm*—Norris, McLaughlin & Marcus, P.A.

(57) ABSTRACT

An optical fiber or electrical power cable with at least one electrochemical chemical analyte sensor which includes a conductive polymer which extends longitudinally along the length of the cable. The polymer has electrical properties which undergo a reversible change when in contact with a chemical analyte. The conductive polymer can be a conductive polymer composite including an immiscible polymer blend of at least two polymers and a conductive filler which is dispersed in one of the polymers of the blend through a multiple percolation process. The cable has a jacket and the sensor(s) are disposed outside the core in proximity to an inner or outer surface of the jacket, or as part of the jacket, and not energy coupled to any energy converging media in the cable, so that the presence of analytes in contact with the cable can be detected, the location along the longitudinal length of a cable where the cable is exposed to the analytes can be determined, penetration of the analytes into the cable occurs can be detected, whether damage has been caused to the cable by the analytes or otherwise can be determined and the identity of an analyte which is in contact with the cable can be determined.

66 Claims, 5 Drawing Sheets

ENERGY CABLE WITH ELECTROCHEMICAL CHEMICAL ANALYTE SENSOR

FIELD OF INVENTION

The present invention relates generally to detecting chemical analytes which are in contact with a cable for conveying energy and, more specifically, a cable for conveying optical and/or electrical energy having an electrochemical chemical analyte sensor including a conductive polymer composite the electrical properties of which reversibly change upon exposure to chemical analytes.

BACKGROUND OF THE INVENTION

Cables for conveying energy, such as optical fiber cables which convey optical signals, electrical power cables which convey electrical power or hybrid cables which convey optical signals and electrical power, are often buried underground or disposed in ducts which are buried underground. The owners or operators of such buried energy cables are concerned about exposure of the cables to chemicals in the ground, which can be the result of accidental spills or natural occurrences, because the chemicals, either in liquid or vapor phase, can damage and eventually penetrate through the protective outer jacketing of the energy cables. The cable outer jacketing, when undamaged, ordinarily encircles or surrounds the energy conveying media in an energy cable.

When the protection that the outer jacket provides to a cable is compromised, materials such as water and harmful chemicals can come in contact with and damage, for example, the optical fiber within a optical fiber cable or the electrical insulation within an electrical power cable, which can cause a disruption or complete loss of optical signal transmission capability, i.e., data communications service, in an optical fiber cable or of electrical power conveyance capability in an electrical power cable. Although an analyte which has caused damage to the cable jacketing may not come in contact with the energy conveying media to cause damage thereto, the damage that an analyte can cause to the cable jacketing can expose the energy conveying media and make the media susceptible to damage from other environmental elements, such as water, dirt, ice, rodents, etc., because the outer jacket would no longer protect against such elements.

Further, hydrocarbon-based chemicals, which are chemicals commonly involved in a spill of chemicals onto the ground, can cause damage to an energy cable which degrades or disrupts the service that the cable is providing, and can be a combustion hazard if they enter an underground duct in which the cables are installed.

Various sensors exist for detecting chemical analytes. For example, chemical analyte sensors including conductive components whose conductivity changes when exposed to a chemical analyte are known in the art. See, for example, U.S. Pat. Nos. 5,417,100, 5,698,089 and 5,672,297, incorporated by reference herein. Also known are electrochemical chemical analyte sensors which are for use with pipe lines or containers which transport or store organic solvents and which include conductive polymer composite materials having conductive particles added thereto at concentrations above the electrical percolation concentration threshold. See U.S. Pat. No. 5,574,377, incorporated by reference herein.

Elongate sensors comprising conductive polymers are also described in U.S. Pat. No. 5,015,958. However, the structures described are complicated and are difficult and complicated to manufacture.

Currently, the presence of a harmful analyte in the ground, which is in contact with a buried energy cable and can damage the jacketing and the energy conveying media of the cable to cause a disruption of the service(s) provided by the cable, is not detected until a disruption or loss of the service(s) that the cable is providing occurs and is noticed by a user of such service(s). Although the longitudinal location along the length of the cable where the cable has been damaged by an analyte can be determined using known techniques, such as time domain reflectometry which would be performed on the energy conveying means of the cable, for example, an optical fiber, after a service disruption has been observed, the cable usually has been so severely damaged by the time a service disruption is noticed that extensive and costly repair, possibly including replacement, of the damaged portion of the cable would be required.

In the prior art, there is no practical and inexpensive technique for detecting whether a cable is exposed to an analyte, determining the location along the longitudinal length of the cable where there is exposure to the analyte, determining the extent that an analyte has penetrated radially inwardly into the cable and determining the damage that an analyte has caused to a cable.

What is needed, and apparently lacking in the art, is an electrochemical chemical analyte sensor which can be inexpensively provided in an energy cable and be utilized to detect whether a cable is exposed to a chemical analyte, to determine the location along the longitudinal length of the cable where the cable is exposed to an analyte, to determine the extent that an analyte has penetrated into the cable, to determine the amount of damage that a chemical analyte has caused to the cable and to identify or determine the type of an analyte to which the cable is exposed.

SUMMARY OF THE INVENTION

In accordance with the present invention, a cable for conveying optical and/or electrical energy includes a longitudinally extending core which contains at least one energy conveying means, such as an optical fiber or electrical conductor, a longitudinally extending outer covering or jacket which surrounds the core and at least one longitudinally extending electrochemical chemical analyte sensor outside the core and not energy coupled to the at least one energy conveying means. In a preferred embodiment, the electrochemical sensor of the cable is a part of the jacket and optionally is energy coupled to the at least one energy conveying means. The electrochemical sensor includes a conductive polymer composite ("CPC") providing a conductive network or path along its longitudinal length and having an affinity for at least one chemical analyte and electrical properties which undergo a reversible change when the CPC is exposed to the at least one chemical analyte. Preferably, the electrical conductivity of the CPC undergoes a predetermined reversible degradation where it is exposed to the at least one chemical analyte to indicate (i) whether the analyte is in contact with the cable; (ii) the location along the longitudinal length of the cable where the analyte is in contact with the cable; (iii) the penetration of the analyte radially inward into and toward the longitudinal axis of the cable; (iv) the damage caused to the cable by the analyte; and (v) the identity of the analyte.

In a preferred embodiment, the electrochemical sensor is in the form of at least one longitudinally extending, continuous stripe disposed at least partially within the outer jacket of the cable. Preferably, the outer surface of at least one stripe is disposed substantially at or tangent to a nominal outer periphery or outer surface of the cable jacket to provide that an analyte in contact with the cable jacket can be detected. The stripe can lie in a plane intersecting the cable axis or can be helically wound around the axis.

In a further preferred embodiment, the electrochemical sensor is in the form of at least one longitudinally extending stripe disposed substantially between a nominal inner periphery or inner surface of the cable jacket and the nominal outer periphery of the jacket, but spaced from the nominal outer periphery of the jacket, to provide that the extent of penetration of an analyte radially inwardly, with respect to the longitudinal axis of the cable, of the cable jacket can be determined. In still a further preferred embodiment, the cable includes a first plurality of longitudinally extending stripes of a CPC disposed at or tangent to the nominal outer periphery of the outer jacket, and a second plurality of longitudinally extending stripes of a CPC disposed within the jacket and at or tangent to the nominal inner periphery of the outer jacket.

In a preferred embodiment, the stripe(s) of the CPC of the electrochemical sensor are co-extruded with a plastic material from which the outer jacket is formed during manufacture of the cable.

In one preferred embodiment, the electrochemical sensor in the energy cable is comprised of a CPC of an immiscible polymer blend generated according to percolation theory and having at least two phases and a conductive filler preferentially dispersed in one phase of the blend. The electrochemical sensor can, for example, be of the form disclosed in U.S. application Ser. No. 09/268,884, entitled Electrochemical Sensors Made From Conductive Polymer Composite Materials and Methods of Making Same, filed on Mar. 16, 1999 by the assignee of this application and incorporated by reference herein. Furthermore, the CPC materials in the blend can include CPC materials having the attributes disclosed in U.S. application Ser. No. 09/307,057, entitled Conductive Polymer Composite Materials and Methods of Making Same, filed on May 7, 1999, which issued as U.S. Pat. No. 6,197,219 on March 6, 2001, and U.S. application Ser. No. 09/406,193, entitled Crosslinked Conducting Polymer Composite Materials and Method of Making Same and filed on Sep. 27, 1999, which are assigned to the assignee of this application and are incorporated by reference herein.

In a preferred embodiment, the immiscible polymer blend includes a major phase material and a minor phase material and the major and minor phase materials are formed from polymers selected from a group which when mixed will not engage in electrostatic interactions that promote miscibility. The major phase material is selected to have an affinity for at least one chemical analyte and provide the electrochemical sensor with a predetermined sensitivity to the at least one chemical analyte.

In a further preferred embodiment, the minor and major phase materials and the conductive filler are selected to minimize the total conductive phase of the CPC in accordance with the multiple percolation technique such that the sensor has a predetermined exacerbated sensitivity to a chemical analyte.

In still a further preferred embodiment, the CPC of the electrochemical sensor, which includes a minor phase material and a major phase material, can include an additional major phase material having an affinity for at least one additional chemical analyte and in which is dispersed the major phase material of the already existing CPC to provide that the sensor can be utilized to selectively detect a plurality of different chemical analytes which are in contact with the cable.

In a preferred embodiment, the sensor in the cable includes a CPC which has predetermined electrical properties in the presence of a target chemical analyte to provide that the target analyte can be identified when it is in contact with the sensor.

In one aspect of the present invention, the cable of the present invention is included in a chemical analyte detection system having electrical energy transmission and electrical energy reception means coupled to the electrochemical sensor in the cable and a data collection and processing means. The system can collect data representative of the transmission of electrical energy, such as high frequency electrical signals, at at least one end of the sensor of the cable and the reception of a reflected portion of the electrical signals at the same end of the cable. A portion of the electrical energy signal transmitted at one end of the sensor would be reflected at a location along the longitudinal length of the cable spaced away from the one end and toward the opposing end if the analyte to which the sensor has an affinity has come in contact with the CPC of the sensor and degraded the electrical conductivity of the CPC or made the CPC insulative to create a fault or discontinuity in the conductive path. The system can process the collected data to provide an indication as to whether a cable is exposed to a chemical analyte, the particular analyte to which the cable is exposed, the location along the longitudinal length of the cable where the cable is exposed to the analyte, the extent that an analyte has penetrated radially inwardly through the cable jacket towards the cable core and the damage that an analyte has caused to the cable.

BRIEF DESCRIPTION OF THE DRAWINGS

Other objects and advantages of the present invention will be apparent from the following description of the presently preferred embodiments thereof, which description should be considered in conjunction with the accompanying drawings in which.

DETAILED DESCRIPTION OF PREFERRED EMBODIMENTS

The invention is illustrated below in connection with optical fiber cables and electrical power cables, each of which includes at least one longitudinally extending electrochemical chemical analyte sensor comprised of a conductive polymer having an affinity for at least one chemical analyte and predetermined electrical properties which undergo reversible change when the conductive polymer is in contact with the at least one analyte. As discussed below, preferred embodiments of the sensor can include a conductive polymer composite which is fabricated in accordance with the multiple percolation technology disclosed in the commonly assigned applications referred to above. It is to be understood that, in accordance with the present invention, the exemplary sensors discussed below can be utilized in either an optical fiber cable or an electrical power cable or a composite or hybrid electro-optical cable.

Figure 1:
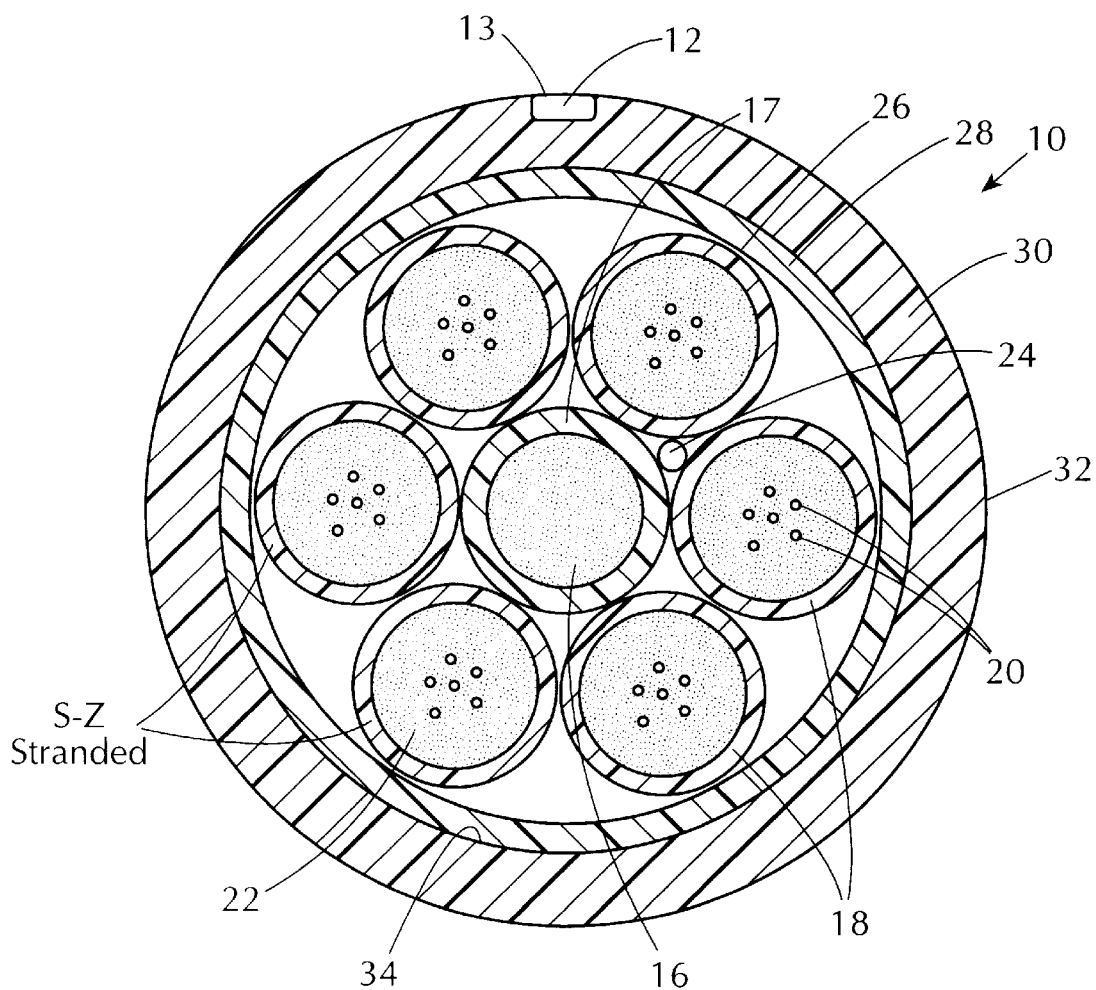
FIG. 1 is a cross-sectional view of an optical fiber cable including an electrochemical chemical analyte sensor of the present invention disposed at the nominal outer surface of the outer jacket of the cable.

FIG. 1 illustrates a preferred embodiment of an optical fiber cable 10 including an outer electrochemical chemical analyte sensor 12 in accordance with the present invention. Referring to FIG. 1, the cable 10 includes a longitudinally extending core comprising a longitudinally extending central strength member 16 which can be metallic or dielectric material and is surrounded by a plastic insulation coating 17. Six plastic buffer tubes 18, each of which loosely contains six optical fibers 20, are stranded longitudinally along the length of the strength member 16.

Preferably, the tubes 18 are stranded along the central strength member 16 in S-Z fashion, or reverse oscillating lay, which, as is known in the art, provides buffer tube slack at the portions where the direction of the winding of the buffer tubes 18 reverses. The buffer tubes 18 are made of a polyolefin, such as PBT, polyethylene or polypropylene, or a polyester. A known type of flowable filling material 22, such as a water blocking compound, buffer tube filling material, oil or gel, fills any or all of the empty spaces within the buffer tubes 18 which are not occupied by the fibers 20, thereby permitting the fibers 20 to move freely within the respective tubes 18.

A water swellable yarn 24 is disposed longitudinally along the length of the strength member 18 and between the buffer tubes 18 and the insulation coating 17.

In an alternative preferred embodiment, at least one of the tubes 18 contains optical fibers 20 which are arranged as optical fiber ribbons (not shown) according to a loose buffer tube design. Empty spaces within the buffer tube 18, which the fiber ribbons do not occupy, are filled with a thixotropic PAO based or a thixotropic silicone oil-based gel filling compound similar to the compound 22 which permits the ribbons and, hence the fibers therein, to move freely within the tube 18.

In another alternative preferred embodiment, the central strength member 16 of the core can be replaced by a central buffer tube which loosely contains optical fibers or optical fiber ribbons according to a central loose tube design in which event a strength member would be disposed around the central buffer tube or in or adjacent the jacket hereinafter described.

Preferably, the core comprising the central strength member 16 and the buffer tubes 18 is encircled by one or more other layers, e.g., metal armor, tape or extruded plastic. For example, the core can be encircled by a layer 26 which can be steel armor layer, preferably with protective and/or bonding material thereon, which extends longitudinally along the length of the cable 10 and encircles or surrounds the buffer tubes 18. A cable with such armor layer 26 advantageously would be less likely to be at risk for damage when exposed to chemical analytes.

Alternatively, or in addition, the layer 26 can comprise a jacketing or sheath layer 28 which encircles or surrounds the armor layer or the core. Preferably, the sheath layer 28 is extruded and is formed from polyethylene, and preferably a medium density polyethylene jacket compound. Preferably, when metal armor is used, a polymeric coating layer is disposed on the outer surface of the armor to promote adhesion between the armor and any overlying plastic layer.

In another preferred embodiment, one or both of the layers 26 and 28 can be a binder tape which may or may not be water swellable.

In preferred embodiments, the core can include other elements, such as water swellable tapes, flame retardent tapes or fillers or aramid, steel or e-glass strength members, as is known in the art.

In a further preferred embodiment, the core can include an inner plastic jacket which is disposed between the armor layer 26 and the sheath layer 28.

Referring to FIG. 1, a protective outer sheath or jacket 30 having outer and inner peripheral surfaces 32 and 34, respectively, completely encircles the layer 26 along its longitudinal length to form the cable 10. Preferably, the outer and inner surfaces 32, 34 of the jacket 30 and the outer surface of the sheath 28 are of a generally circular shape in cross-section as shown in FIG. 1. It is to be understood, however, that the jacket 30 can have a cross-sectional shape other than circular, e.g., the shape of an oval.

The jacket 30 is preferably extruded over the core and can be formed from high density polyethylene (HDPE), linear low density polyethylene (LLDPE), medium density polyethylene (MDPE), polyvinylchloride (PVC) or other cable jacket materials known in the art. The jacket 30 is longitudinally and circumferentially continuous and substantially moisture impervious.

In accordance with the present invention, the electrochemical chemical analyte sensor 12 of the cable 10 is comprised of a conductive polymer composite (CPC) which extends longitudinally along the length of the cable 10, is outside the core and not energy coupled to any of the energy conveying media which is also contained in the cable. In one alternative preferred embodiment, the sensor 12 is part of the jacket 30 and is not energy coupled to any of the energy conveying media in the cable. In a further alternative preferred embodiment, the sensor 12 is part of the jacket 30 and energy coupled to an energy conveying media in the cable. The CPC provides a conductive network or path extending between the opposing ends of the sensor 12 when the sensor 12 is not exposed to an analyte to which the CPC of the sensor 12 has an affinity.

In a preferred embodiment, the CPC preferably extends the entire length of the cable 10 and is disposed at least partially within what would be the uninterrupted outer periphery or surface 32 and inner periphery or surface 34 of the jacket 30. In the absence of the sensor 12 in the cable 10, the outer surface 32 would be continuous and, preferably, conform substantially to the outer surface of a tube of a constant outer surface radius. For convenience, the outer surface 32 and the inner surface 34 of the jacket 30 are referred to as the "nominal" outer and inner peripheries or surfaces, respectively, of the jacket 30 and the radial position of the sensor 12, with respect to the longitudinal axis of the cable 10, is related to the nominal outer and inner peripheries of the jacket 30.

In the preferred embodiment illustrated in FIG. 1, the outer sensor 12 is part of the jacket 30 and the CPC of the outer sensor 12 longitudinally extends along the full length of the cable 10 and has a surface portion 13 which is tangent to and does not substantially protrude outwardly beyond the nominal outer periphery of the plastic jacket 30. The outer sensor 12, preferably, does not include a surface portion which is positioned as close to the longitudinal axis of the cable 10 as the nominal inner periphery of the jacket 30.

In a preferred embodiment, the CPC of the outer sensor 12 is in the form of a longitudinally extending stripe and made of materials which can be co-extruded with the material from which the plastic jacket 30 is formed during manufacture of the cable 10. The radial thickness of the stripe forming the sensor 12, with respect to the longitudinal axis of the cable 10, is between the thickness of the jacket 30 and a minimum thickness necessary to provide that an analyte which is in contact with the sensor 12 can be detected, as described in detail below. Preferably, the radial thickness of the CPC is less than the radial thickness of the jacket. Also, preferably, the circumferential dimension of the CPC forming the stripe is small relative to the peripheral dimension of the surface 34, i.e., less than 10% of such peripheral dimension of the surface 34. The smaller circumferential dimension of the CPC stripe in relation to the peripheral dimension avoids the possibility that, although an analyte has caused some damage to the sensor at a longitudinal location along the cable, a sufficient circumferential dimension of the sensor remains undamaged. The undamaged portion would provide that a conductive path in the sensor still exists through the circumferential sensor portion exposed to the analyte, such that contact between the sensor and the analyte would not be detected at that instant, thereby allowing the analyte to cause further damage to the cable.

In another preferred embodiment, the CPC sensor is in the form of a helix extending around the longitudinal axis of the cable.

The CPC included in the sensor 12 has an affinity for at least one chemical analyte and predetermined electrical properties, such as conductivity and/or capacitance, which undergo a predetermined reversible change when an analyte to which the CPC has an affinity is in contact with the sensor 12. In a further preferred embodiment, the reversible change is a degradation in the electrical conductivity of the CPC of the sensor 12, which preferably makes the CPC insulative, and the change in the electrical conductivity that the analyte would cause is readily measurable.

In a preferred embodiment, the CPC in the sensor 12 is comprised of an immiscible polymer blend created according to the percolation theory and containing a minor phase polymeric material and at least one major phase polymeric material having an affinity for at least one chemical analyte, where the minor and major phases are co-continuous, and a conductive filler preferentially located in the minor phase or at the interface of the minor and major phases, as described in Ser. No. 09/268,884. In one preferred embodiment, the immiscible polymer blend of the CPC is comprised of a minor phase polymeric material; a conductive filler which is preferentially dispersed in the minor phase polymeric material in an amount sufficient to generate a continuous conductive network in the minor phase polymeric material and form a binary composite; and a major phase polymeric material having an affinity for at least one chemical analyte. The binary composite is dispersed in the major phase polymeric material in an amount sufficient to generate a continuous conductive network in the major phase polymeric material, i.e., the major and minor phases are co-continuous in that the level of the minor phase is at the percolation threshold, and form a conductive ternary composite of the immiscible polymer blend. The major phase polymer when exposed to the analyte to which it has an affinity undergoes swelling or volumetric expansion to cause the electrical conductivity of the conductive ternary composite to undergo a reversible change. Additionally, the major phase polymeric material and the minor phase polymeric materials are selected such that the major phase material when mixed with the binary composite will not engage in electrostatic interactions that promote miscibility.

Although the swelling of the major phase is usually the primary mechanism affecting the conductivity of the CPC when the CPC is exposed to a chemical analyte, other properties of the chemical analyte may contribute to the change in the conductivity of the CPC. For example, certain constituents or properties of the chemical analyte, when diffused into the major phase material, can interrupt or interact with the continuous conductive network to cause a reversible change in the conductivity of the CPC.

In the preferred CPC, minimizing the total conductive phase, i.e., that phase in which the conductive filler is dispersed, contributes to providing a highly sensitive electrochemical sensor. Electrical conductivity is imparted to the CPC by dispersing a conductive filler primarily in one phase of the immiscible blend. In a preferred embodiment, the mismatch in the minor and major phase solubility parameter and the alteration of the chemical nature of the minor/major phase and minimization of the total conductive phase of the CPC provides that the sensor 12 is a highly selective and sensitive sensor for a specific analyte.

In a preferred embodiment, the conductive filler is incorporated into the minor phase material before the minor phase is melt blended with the major phase material. Preferably, imparting conductivity to the CPC consists essentially of percolating a conductive filler in a minor phase and then subsequently percolating the conductive filler/minor phase composite in a major phase using a "multiple percolation" technique, which is based on the physics of network formation of a minor phase material in a differing major phase material. The level at which a minor phase is just sufficiently incorporated volumetrically into a major phase where both phases are co-continuous is termed the percolation threshold. By dispersing the conductive filler in the minor phase in an amount at or just exceeding the percolation threshold and subsequently dispersing the minor phase/conductive filler blend in the major phase in an amount at or just exceeding the percolation threshold, a minor swelling of the CPC will have the effect of significantly increasing the volume resistivity of the CPC, possibly converting it to an insulating material where the conductive network is fully interrupted. The change in volume resistivity would be significantly less in the same CPC which was highly filled above the percolation threshold with a conductive filler.

The material selected for the conductive filler in accordance with the present invention influences the amount of conductive filler required to generate a continuous conductive network in the minor phase polymeric material. In a preferred embodiment, the conductive filler material can be any suitable material exhibiting conductivity and having a chemical structure providing an inherently high conductivity with an affinity to develop a strong network. The conductive filler can be selected from the group consisting of carbon black, graphite, metallic particles, intrinsically conductive polymers, carbon fiber, fullerenes, nanotubes, conductive whiskers and mixtures thereof.

The amount of conductive filler dispersed in the minor phase polymeric material must be sufficient to generate a continuous conductive network in the minor phase polymeric material and, preferably, is in an amount not more than about 5% by weight greater than the amount sufficient to generate a continuous conductive network in the major phase material to assure the desired sensitivity of the electrochemical sensor 12 to the analyte to which the major phase material has an affinity. It is noted that the conductive filler material contributes significantly to the cost of manufacture of the inventive cable with the CPC sensor including the conductive filler, such that it is preferable to include the minimum amount of conductive filler required to assure the desired sensitivity of the sensor 12 to an analyte.

In a preferred embodiment, suitable minor phase polymeric materials for the conducting polymer composite can include any homopolymer or copolymer such as, for example, low density polyethylene (LDPE), high density polyethylene (HDPE), medium density polyethylene (MDPE), linear low density polyethylene (LLDPE), polypropylene (PP), poly-1-butene, poly(styrene) (PS), polycarbonate (PC), poly(ethylene terephthlate) (PET), poly(hexamethylene adipamide) (nylon-6,6), poly(e-caprolactam) (nylon-6) and mixtures thereof.

It is to be understood that one skilled in the art would recognize that the amount of minor phase polymeric material required to meet or exceed the percolation threshold in any given major phase polymeric material depends upon the conductive filler and the major phase polymeric material(s). The description provided herein and examples set forth herein should serve as a guide. For example, it has been found that an immiscible polymer blend having a furnace grade carbon black as the conductive filler, HDPE as the minor phase and poly(ethylene-co-vinyl acetate) (EVA) as the major phase material, where the vinyl acetate content of the EVA is 45% by weight, should have the HDPE/carbon black blend be greater than or equal to about 35% by weight of the total composite to obtain an immiscible conductive polymer composite.

In preferred embodiments, major phase materials can include any polymeric material with an affinity for a chemical analyte and which satisfies the heretofore described criteria for not engaging in electrostatic interactions that promote miscibility in relation to the heretofore described minor phase materials. It is critical that the minor phase/major phase(s) blend is immiscible. It should be noted that minor electrostatic interactions may be permissible within the above criteria as long as miscibility is not promoted. In the preferred embodiments, the major phase material can include, for example, EVA, polybutylene terphthalate (PBT), PS, poly(methyl methacrylate) (PMMA), HDPE, LLDPE, LDPE, MDPE, PP, polyisobutylene, poly(vinyl chloride) (PVC), poly(vinylidene chloride), poly(vinylidene fluoride) (PVDF), poly(tetrafluoroethylene) (PTFE), poly(vinyl acetate) (PVAc), poly(methyl acrylate), polyacrylonitrile, polybutadiene, PET, poly(8-aminocaprylic acid), nylon-6,6, poly(vinyl alcohol) (PVA), and mixtures thereof. Preferably, the solubility parameter difference ($\delta_A - \delta_B$) of the minor and major phase materials of the ternary composites satisfy the following criteria for immiscibility:

$$U_L \geq (\delta_A - \delta_B)^2 \geq 0$$

where, $U_L$=7, more preferably 5;

$\delta_A$=the solubility parameter of the minor phase material; and $\delta_B$=the solubility parameter of the major phase material.

It is further noted that all of the minor phase materials can be utilized as major phase materials, depending of course on the other constituents which are present in the composite.

It is to be understood that one skilled in the art will recognize that the selection of a major phase material and the amount of the selected major phase material that is utilized also depend upon the presence of other constituents in the composite and the specific application for the electrochemical sensor, and the description and examples set forth herein should serve as a guide.

In preferred embodiments, major/minor phase pairs can include minor phase materials such as HDPE, LLDPE, MDPE, LDPE, and poly-11-butene paired with major phase materials such as EVA, PS, PVC, poly(vinylidene chloride), PTFE, PVA, PMMA, polyacrylonitrile, polybutadiene, PET, poly(8-aminocaprylic acid), nylon-6,6. In addition, the minor phase materials PS, PC, nylon-6,6 and nylon-6 can be paired with major phase materials HDPE, LLDPE, MDPE, LDPE, PP and polyisobutylene.

It is to be understood that the above-identified major phase and minor phase materials for use in pairings of minor and major phase materials are exemplary and that those skilled in the art of polymer science and engineering will recognize that a multiplicity of materials and pairings are possible based on the criteria heretofore described for selection of suitable minor and major phase polymeric materials.

It is further noted that the affinity of the major phase or major phases of a CPC to a specified analyte is determined by the permeability of the major phase to the specified analyte. The permeability is a function of the solubility of the major phase in the specified analyte and the ability of the specified analyte to diffuse into the major phase. Thus, the major phase material may be selected based on these properties as well as the desired sensitivity of the electrochemical sensor for a specific targeted analyte. The sensitivity of the electrochemical sensor, however, also is dependent on conductive filler content, as described above.

In a further preferred embodiment, when it is expected that the CPC included in the sensor 12 in the cable 10 of the present invention will be exposed to aggressive or moderately aggressive solvents for extended periods of time, the CPC in the sensor 12 can be crosslinked. The preferred CPC of the invention can be crosslinked by selecting semicrystalline components for the minor and major phases of the composite to create a physical crosslink in the composite due to the crystalline structure of the constituent chains; by irradiating the thermoplastic composite with γ-radiation or β-radiation; by copolymerization or grafting of a hydrolyzable group on the major phase which will effect chemical crosslinking of the final composite when introduced to moisture; or by chemical crosslinking with the addition of a peroxide to the major phase, thereby effecting crosslinking with the decomposition of the peroxide and subsequent generation of free radicals at elevated temperatures.

In a typical installation of the cable 10, the cable 10 is buried underground or disposed in a duct which is at least partially buried underground. When the electrochemical sensor 12 of the cable 10 comes in contact with a liquid or vapor phase of a chemical analyte to which a major phase of the CPC has an affinity, the CPC in the sensor 12 undergoes dilatation through swelling to cause the conductive cross section of the CPC material to be reduced, which results in an increase in the volume resistivity of the material. The dilation results in a reversible destruction of conductive paths in the CPC at locations along the longitudinal length of the cable 10 at which the analyte is in contact with the sensor 12. Consequently, the CPC acts as an electrochemical sensor which undergoes a reversible degradation in electrical conductivity when exposed to a chemical analyte.

In a preferred embodiment, the electrochemical sensor 12 can incorporate several electrochemical chemical analyte sensors in a single CPC. A CPC which is a multiple analyte sensor can be formed by dispersing the CPC already formed into additional major phase material in an amount sufficient to generate a continuous conductive network in each of the additional major phase materials. Each additional major phase material is selected to have an affinity for at least one additional chemical analyte and each of the additional major phase materials is selected from that group of polymers which when mixed with the CPC already formed will not engage in electrostatic interactions that promote miscibility with the minor phase material, the major phase material and the other additional major phase materials. Further, the amount of the CPC dispersed in the additional major phase materials must be sufficient to be continuous with the additional major phase materials. Thus, the electrochemical sensors can selectively detect the presence of different chemical analytes.

Referring again to FIG. 1, in a preferred embodiment, the electrochemical sensor 12 in the cable 10 which extends longitudinally along the length of the cable 10 with the surface portion 13 tangent to the nominal outer periphery of the jacket 30 can be utilized to detect whether the jacket 30 of the cable 10 is exposed to an analyte, to determine the location along the longitudinal length of the cable where the cable is exposed to the analyte and to determine the particular analyte to which the cable is exposed.

Figure 2:
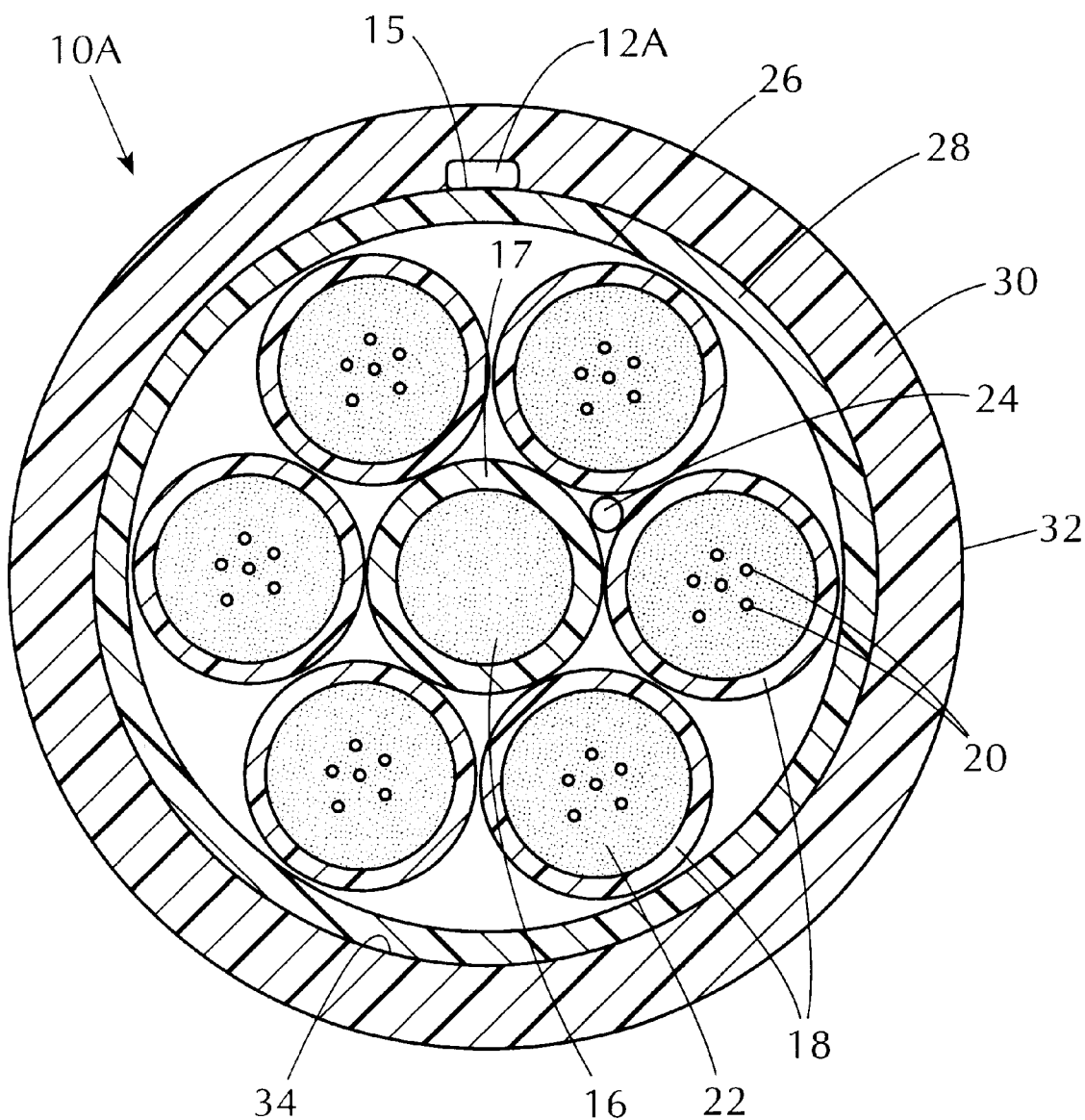
FIG. 2 is a cross-sectional view of an optical fiber cable including an electrochemical sensor of the present invention disposed at the nominal inner surface of the outer jacket of the cable.

FIG. 2 illustrates a further preferred embodiment of a cable 10A which is identical in structure to the cable 10 except that the sensor 12 is replaced by a longitudinally extending electrochemical sensor 12A disposed within the cable jacket 30 and having an inner surface portion 15 tangent to the nominal inner periphery of the cable jacket 30. Like reference numerals are used to refer to elements having similar, and preferably identical, structural and functional characteristics as those described above in connection with the cable 10. Referring to FIG. 2, the sensor 12A does not include a surface portion which is positioned as far from the longitudinal axis of the cable 10 as the nominal outer periphery of the jacket 30. The sensor 12A, therefore, can be used to determine whether a chemical analyte has penetrated radially inwards through the cable jacket 30 and towards the core.

The jacket 30 of the cable 10A constitutes an insulative barrier between the sensor 12A and the environment outside the cable and, therefore, prevents the conductive network or path of the sensor 12A from being exposed to an analyte which is outside the cable jacket 30 but in contact with the outer surface 32 of the cable jacket 30. If the jacket 30 is intact and has not been damaged by, for example, a chemical analyte, such that an analyte to which the CPC in the sensor 12A has an affinity cannot penetrate the cable jacket 30 to come in contact with the sensor 12A, the CPC of the sensor 12A would have a predetermined electrical conductivity. On the other hand, if the jacket 30 has been damaged by an analyte or otherwise to provide that an analyte to which the CPC in the sensor 12A has an affinity can penetrate through the jacket 30 and come in contact with the sensor 12A, the CPC of the sensor 12A would undergo a reversible change in, or degradation of, its electrical conductivity.

Preferably, the sensors 12 and 12A of the cables 10 and 10A, respectively, constitute relatively thin longitudinally extending stripes which do not include surface portions which, respectively, extend as close to the longitudinal axis of the cable as the inner periphery of the jacket 30 and as far from the longitudinal axis of the cable as the outer periphery of the jacket 30. However, either or both of the sensors 12 and 12A can be embedded in the jacket 30 so that no surface thereof is outside the jacket 30, so that the inner surface 15 of the sensor 12A protrudes from the inner surface 34 or so that the outer surface 13 of the sensor 12 protrudes from the outer surface 32.

In a preferred embodiment, a single cable can include both of the sensors 12 and 12A as shown disposed in the cables 10 and 10A in FIGS. 1 and 2, respectively, to provide that (i) contact of an analyte with the cable jacket 30 can be detected by monitoring changes in the electrical conductivity within the conductive network of the sensor 12; (ii) penetration of an analyte through the jacket 30 can be determined by monitoring changes in the electrical conductivity within the conductive network of the sensor 12A; and (iii) the damage that an analyte, which the cable has been exposed to and which has penetrated the outer jacket 30, has caused and continues to cause to the cable can be determined.

In an alternative embodiment, the sensors 12 and 12A can be in the form of longitudinally extending stripes applied to the outer surface 32 and inner surface 34, respectively, and protruding from the respective surfaces 32 and 34 of the jacket 30. In such case, the stripes would be bonded to the jacket surfaces such as by co-extrusion of jacket plastic and sensor plastic which will bond during extrusion.

In a preferred embodiment, the CPC sensors 12 or 12A, each having at least two phases as described above, can contain materials and have physical characteristics, such as tensile strength, moisture impermeability, etc., similar to those of the material of the jacket 30, such that the inclusion of stripe CPC sensors in the jacket 30 does not weaken the jacket 30.

In one preferred embodiment of the inventive cable, the jacket 30 of the cable or a layer in the space between the jacket 30 and the core constitutes at least one peripheral encircling layer of the at least two phase CPC sensor material described above.

In a further preferred embodiment, the electrical properties of the CPC in the sensor 12 or 12A can be precharacterized in the absence and presence of a target chemical analyte to which the CPC has an affinity such that the exposure of the cable 10 to such target analyte can be determined. For example, it is known that different analytes affect the conductivity of a CPC differently in terms of the absolute change in the electrical conductivity of the CPC that would result when the CPC is exposed to an analyte and the rate of change in the electrical conductivity of the CPC upon initial and continued exposure of the CPC to the analyte. By monitoring changes in the conductivity and the rate of changes in the conductivity of the CPC using conventional techniques, as explained below, a determination can be made as to whether a particular target analyte is in contact with a cable including the electrochemical sensor of the present invention.

Figure 3:
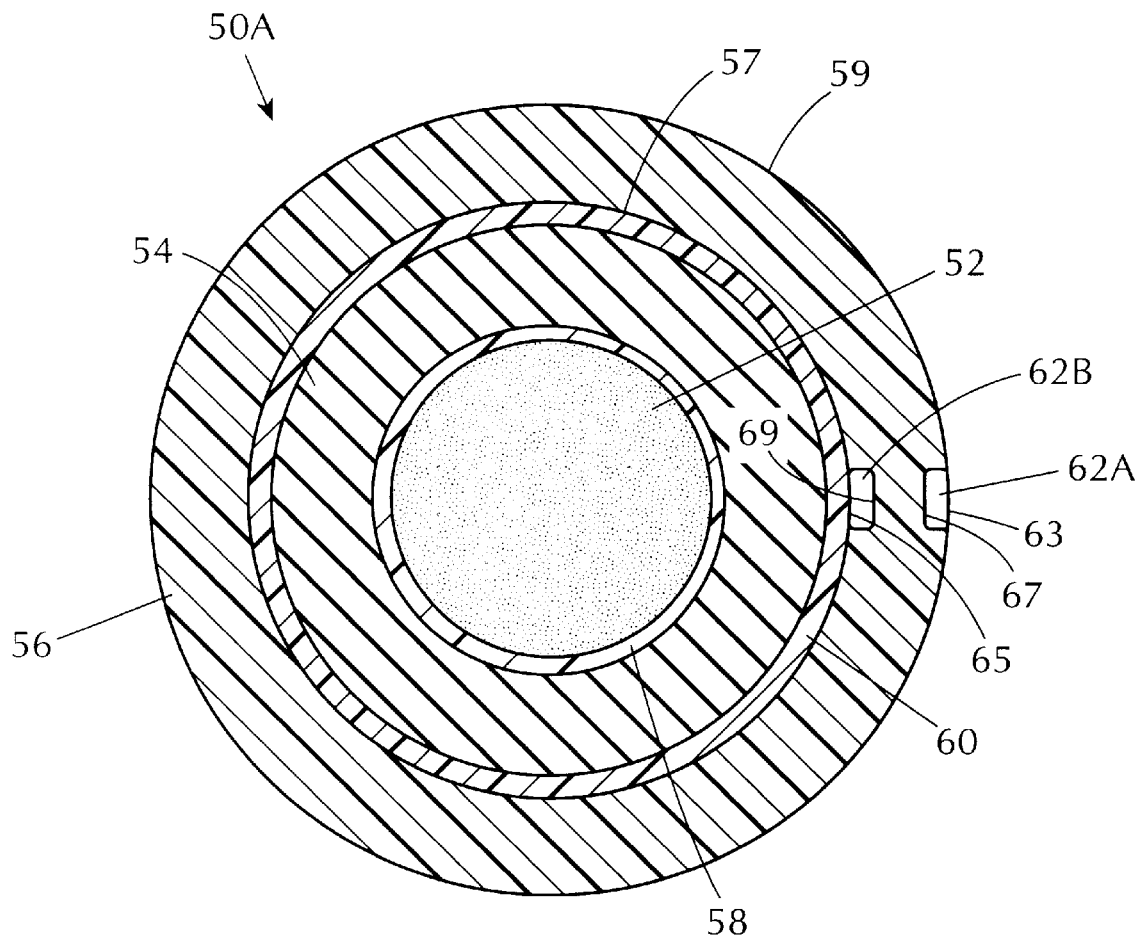
FIG. 3 is a cross-sectional view of an electrical power cable including first and second electrochemical sensors of the present invention disposed, respectively, at the nominal inner surface and the nominal outer surface of the outer jacket of the cable.
Figure 4:
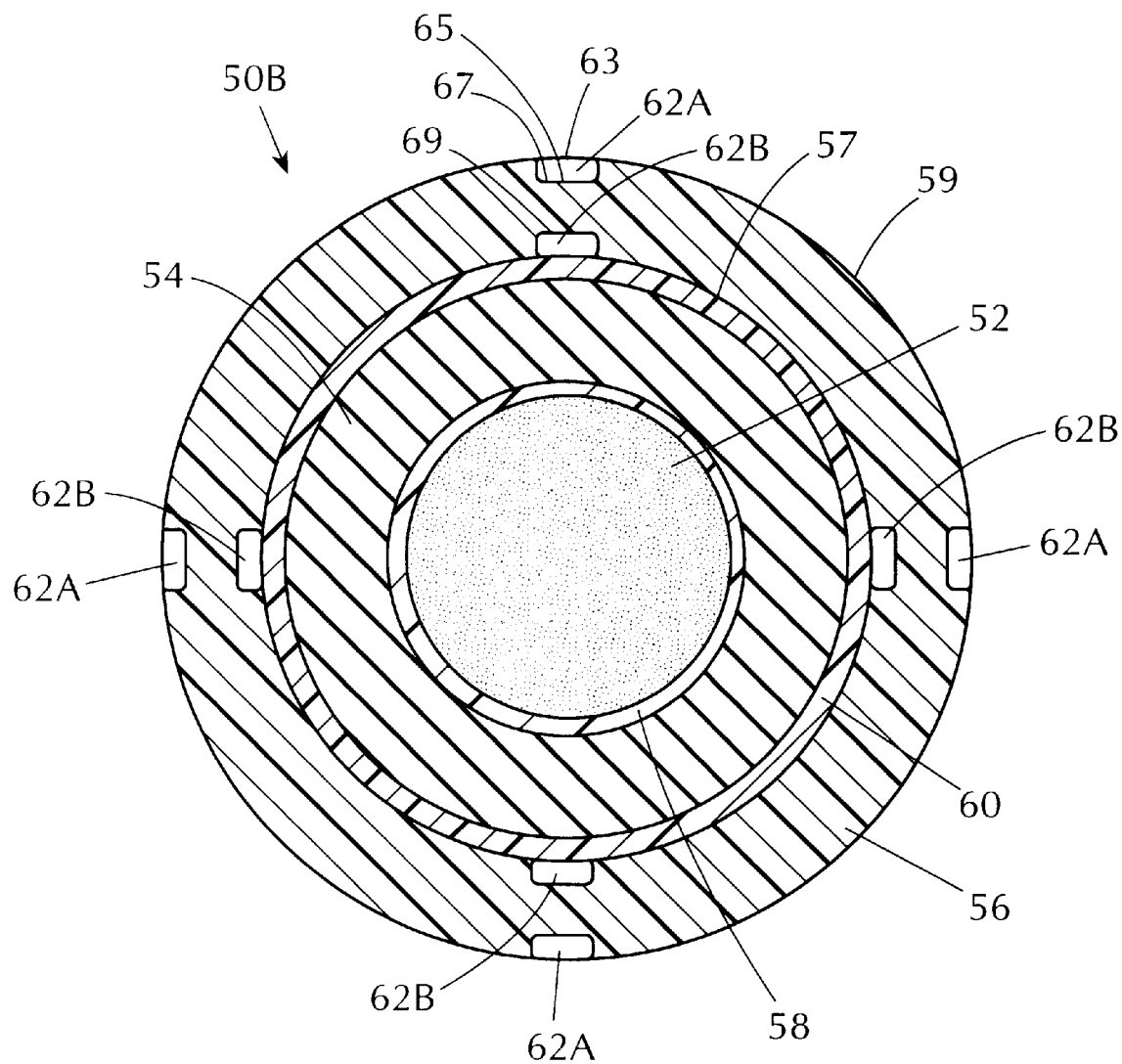
FIG. 4 is a cross-sectional view of an electrical power cable including a plurality of first and a plurality of second electrochemical sensors of the present invention disposed, respectively, at the nominal inner surface and the nominal outer surface of the outer jacket of the cable.

FIG. 3 and FIG. 4 illustrate exemplary electrical power cables 50A and 50B, respectively, including electrochemical chemical analyte sensors in accordance with the present invention. Referring to FIG. 3, the cable 50A includes a longitudinally extending central conductor 52, a layer of insulation 54 encircling the conductor 52 and a plastic jacket 56 encircling the insulation 54. The jacket 56 includes nominal inner and outer surfaces or peripheries 57 and 59, respectively, of the jacket 56. Optionally, the electrical cable 50A also includes a semi-conductive conductor shield 58 encircling the conductor 52 and a semi-conductive insulation shield 60 encircling the insulation 54. The cable 50A further can include an electrical shield (not shown) of a metallic tape or concentric neutral copper wires which are disposed between the plastic jacket 56 and the insulation shield 60.

In accordance with the present invention, electrochemical chemical analyte sensors 62A and 62B, each including CPC material of the type included in the sensors 12 and 12A, longitudinally extend within the jacket 56 and have surface portions tangent to, respectively, the outer and the inner peripheries 59 and 57 of the jacket 56.

In a preferred embodiment, the CPCs of the respective sensors 62A and 62B are longitudinally extending stripes which have been co-extruded with the plastic material forming the jacket 56 and, respectively, have surface portions 63 and 65 disposed tangent to the outer and inner peripheries of the jacket 56 and facing surface portions 67 and 69 spaced from each other a predetermined radial distance sufficient to provide that the extent of penetration of an analyte, to which each of the sensors 62A and 62B has an affinity, radially inwardly through the jacket 56 can be readily monitored. In a preferred embodiment of the cables 50A and 50B where the sensor 62A or 62B is a stripe on the inner surface of the jacket 56, the sensor is not in conductive contact with, i.e., is electrically insulated from, the semiconductive shield 60.

In alternative embodiments, the sensors 62A and 62B can be disposed as described hereinbefore in connection with sensors 12 and 12A.

Although the sensors 62A and 62B in the illustrated preferred embodiment shown in FIG. 3 are radially aligned, the sensors 62A and 62B, respectively, can be disposed on different radial lines and there can be a plurality of each of the sensors 62A and 62B, respectively, disposed in circumferentially spaced relation.

The cable 50B shown in FIG. 4 is identical in structure to the cable 50A, except that the cable 50B includes a plurality of pairs of axially aligned sensor stripes 62A and 62B at the outer and inner peripheries, respectively, of the jacket 56. Like reference numerals as used to refer to documents having similar, and preferably identical, structural and functional characteristics as those described above in connection with the cable 50A. The disposition of a plurality of sensors about the inner and outer peripheries of the jacket 56, respectively, permits not only the detection of whether an analyte is in contact with the outer jacket 56 and the determination whether an analyte has penetrated radially inwards through the jacket 56 but also the determination of the circumferential positions of the analyte. Also, since the sensors are disposed at several circumferential positions, it is less likely that analyte damage will be undetected.

Figure 5:
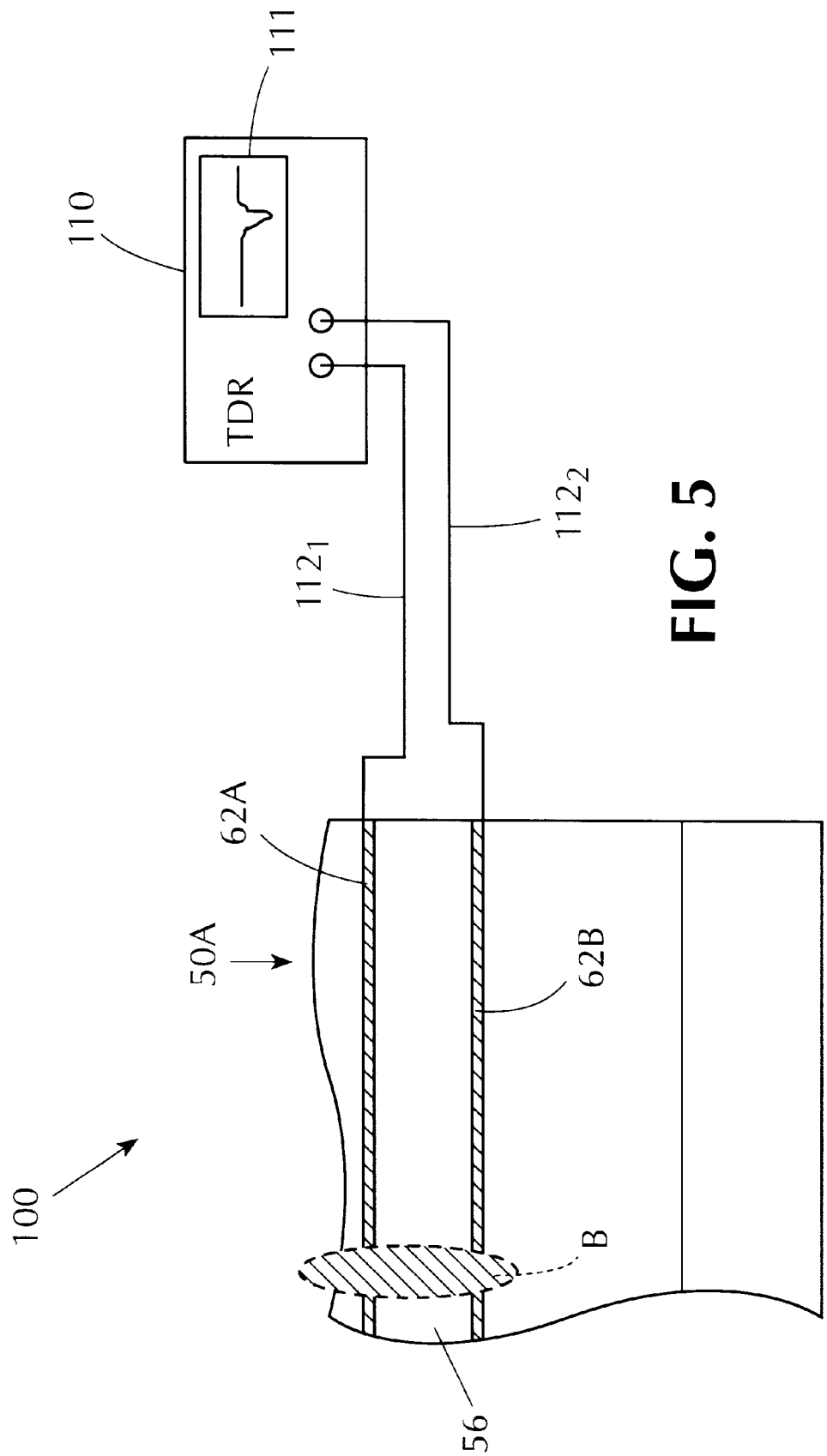
FIG. 5 is a schematic illustration of an exemplary chemical analyte detection system including a time domain reflectometery system which is coupled to the electrochemical chemical analyte sensors included in a cable of the present invention.

FIG. 5 illustrates an exemplary chemical analyte detection system 100 which can detect whether a chemical analyte is in contact with the electrochemical chemical analyte sensors included in the energy cables of the present invention. In FIG. 5, for simplicity in illustration, the components enclosed within the jacket 56 of an embodiment of the cable 50A, which is a part of the system 100, have been omitted. As discussed above, each of the CPCs included in the electrochemical sensors in a cable of the present invention extends longitudinally along the length of the cable and constitutes a conductive path or network. An analyte which contacts the CPC in the sensor will either degrade the conductivity of the CPC or make the CPC insulative, thereby effectively creating a fault or discontinuity in the conductive path at the location along the longitudinal length of the cable where the sensor is exposed to the analyte. Thus, whether a cable is exposed to a chemical analyte, whether the analyte has penetrated the jacket of a cable and whether the cable has been damaged can be determined by monitoring changes in the conductivity, i.e., detecting faults, in the conductive paths of the CPCs of the respective sensors in a cable.

Referring to FIG. 5, the system 100 includes an electrical signal transreceiver and data processor 110 which can perform Time Domain Reflectometry (TDR) to detect faults in the conductive paths of the CPCs of the electrochemical sensors in an inventive cable. The transceiver/processor means 110 is electrically coupled to the sensors 62A and 62B of the cable 50A, which is shown schematically in FIG. 5, by coupling means $112_1$ and $112_2$. The coupling means $112_1$ and $112_2$ can be lengths of electrical conductor.

The transceiver/processor 110 is a conventional component including an electrical signal transmitter, an electrical signal receiver and a microcontroller including a processor and memory, such as RAM and ROM. The microcontroller can collect and process data representative of the transmission of electrical signals to the sensors 62A and 62B and the detection of reflected portions of the transmitted electrical signals which have traveled back to the transceiver/processor 110 over the electrical conductors $112_1$, and/or $112_2$, respectively.

In a preferred embodiment, the transceiver/processor 110 transmits distinct high frequency electrical pulses over the electrical conductors $112_1$, and $112_2$, which are then respectively coupled to one end of the conductive networks of the CPCs of the sensors 62A and 62B and travel along the networks towards the opposing end of the sensors 62A and 62B. At or near a location B along the longitudinal length of the cable 50A where the cable is exposed to an analyte to which the sensor 62A and 62B have an affinity, a discontinuity in the conductive paths of one or both the CPCs in the sensors 62A and 62B can develop.

Assuming that a discontinuity is created at location B initially only within the sensor 62A, because the analyte is in contact with the sensor 62A but has not yet substantially damaged the jacket 56 to provide that the analyte is in contact with the sensor 62B, the discontinuity in the CPC conductive path of the sensor 62A will cause a portion of a pulse transmitted from the transceiver/processor 110 to be reflected back along the sensor 62A, towards the conductor $112_1$ and then to the transceiver/processor 110. The transceiver/processor 110 measures the time interval between the transmission of the pulse from and the reception of the reflected portion of the pulse at the transceiver/processor 110. Initially, data representative of the electrical path length of the conductors $112_1$, and $112_2$ is stored in the memory of the transceiver/processor 110. The transceiver/processor 110 processes data representative of the time measurement made and the electrical path length of the conductor $112_1$ to determine the length of the total travel path of the reflected pulse signal. From the length determination, the distance between the end of the cable 50A and the location along the longitudinal length of the cable 50A where a reflection occurred can be computed. The result of this computation constitutes the distance from the one end of the cable 50A where an analyte is in contact with the cable jacket 56. The transceiver/processor 110 preferably has a graphical display 111 for displaying such distance value in relation to the end of the cable.

In the preferred embodiment, the system 100 can be used to monitor changes in the conductivity in both of the electrochemical sensors 62A and 62B of the cable 50A to provide that a determination can be made as to whether an analyte has penetrated the jacket 56 of the cable. Further, the sensors 62A and 62B can be utilized to track the spread of an analyte longitudinally along the length of the cable by monitoring changes as to the locations along the longitudinal length of the sensor 62A which are detected to be in contact with the analyte. The measurements of changes in the conductivity in the CPC can be made from one or both ends of the sensor 62A.

Based on the information obtained from monitoring the sensors 62A and/or 62B, the system 100 can provide an indication as to (i) whether the cable is in danger of sustaining damage which would cause a disruption of service, such that field technicians should investigate and/or correct a harmful situation in the installation to prevent serious damage to the cable; or (ii) whether the damage is so minimal that the service the cable provides is unlikely to be interrupted and no further investigation or servicing of the cable by a field technician is required. The determination as to whether a service interruption is likely can be made by monitoring whether the analyte has penetrated through the cable jacket, i.e., affected the conductivity of a sensor such as the sensor 62B.

In addition, the transceiver/processor 110 can be designed to monitor the amplitudes of a transmitted signal and a reflected portion of the same transmitted signal to provide information concerning the extent of damage which has been caused to a cable or the particular analyte causing a fault in the conductive path of a CPC of a sensor. Also, relative changes in the amplitude of a reflected signal and the rate of change of the amplitude can be monitored to determine other effects. If desired, the data obtained can be used to operate an alarm when the data indicates that the analyte damage has exceeded a predetermined value.

It is to be understood that, in accordance with the present invention, other methods commonly used to detect faults or discontinuities in the conductive paths of electrical cables and known in the art may be employed to detect the presence of an analyte in contact with the inventive cable or its internal components utilizing the electrochemical sensors incorporated therein. For example, capacitance bridges and vector analyzers can be used in conjunction with directional couplers and wave counters to locate faults in the CPCs forming the sensors in the cables of the present invention.

While various embodiments of the invention have been shown and described, it is to be understood that the above-described embodiments are merely illustrative of the invention and other embodiments may be devised by those skilled in the art which will embody the principles of the invention and fall within the spirit and scope thereof.

What is claimed is:

1. A cable for conveying energy and having a longitudinal axis, the cable comprising:
    a longitudinally extending core including at least one longitudinally extending energy conveying medium encircled by insulation;
    a longitudinally extending outer jacket encircling the core and having an inner surface and an outer surface, defining, respectively, nominal inner and outer peripheries of the outer jacket, the inner surface being spaced from said outer surface and nearer said axis than said outer surface; and
    at least one longitudinally extending electrochemical sensor for detecting the presence of chemical analytes, wherein the sensor is outside the core, extends peripherally about the core without surrounding the core, is not energy coupled to the energy conveying medium and comprises an electrically conductive polymer composite having predetermined electrical properties which undergo a change when exposed to at least one analyte.

2. The cable of claim 1, wherein the electrical property is conductance.

3. The cable of claim 1, wherein the sensor is for detecting the presence of chemical analytes in contact with the jacket and is part of the jacket, longitudinally continuous and substantially longitudinally co-extensive with the jacket.

4. The cable of claim 3, wherein the jacket is a plastic jacket the plastic of which is selected to bond with the polymer of the composite.

5. The cable of claim 1, wherein the sensor is in the form of a stripe having a dimension circumferentially of said axis which is small relative to the dimension of the outer periphery of the jacket.

6. The cable of claim 5, wherein the stripe is embedded in the jacket intermediate the inner and outer surfaces of the jacket and spaced from at least one of the inner and outer surfaces of the jacket.

7. The cable of claim 6, wherein the stripe has a surface substantially co-extensive with the outer surface of the jacket.

8. The cable of claim 6, wherein the stripe has a surface substantially co-extensive with the inner surface of the jacket.

9. The cable of claim 1, wherein there is a plurality of the electrochemical sensors each of which has a dimension radially of said axis which is less than the spacing between said inner and outer surfaces of the jacket and wherein at least one of the sensors has a surface substantially co-extensive with the outer surface of the jacket and at least another of the sensors has a surface substantially co-extensive with the inner surface of the jacket.

10. The cable of claim 9, wherein the sensors lie on lines extending radially of said axis and each sensor which has a surface substantially co-extensive with the outer surface of the jacket lies on the same radial line as another sensor having a surface substantially co-extensive with the inner surface of the jacket.

11. The cable of claim 1, wherein there is a plurality of electrochemical sensors each of which has a dimension radially of said axis which is less than the spacing between said inner and outer surfaces of the jacket and wherein the polymer composite of at least one of the sensors undergoes a change of electrical properties when exposed to a first chemical analyte and the polymer composite of at least one other sensor undergoes a change of electrical properties when exposed to a second, different chemical analyte.

12. The cable of claim 1, wherein the polymer composite of the at least one electrochemical sensor undergoes a change of electrical properties when exposed to any one of a plurality of chemical analytes.

13. The cable of claim 1, wherein the electrochemical sensor is in the form of a helix extending around said axis.

14. The cable of claim 1, wherein the energy conveying medium is an electrical conductor.

15. The cable of claim 1, wherein the energy conveying medium is an optical fiber.

16. The cable of claim 1, wherein the conductive polymer composite is an extrudable immiscible polymer blend comprising:
    a conductive filler material;
    a minor phase material in which the conductive filler material is dispersed in an amount sufficient to generate a continuous conductive network in the minor phase material and form a binary composite; and
    a major phase material with an affinity for the at least one chemical analyte, wherein the major phase material is a polymer which when mixed with the binary composite will not engage in electrostatic interactions that promote miscibility, the major phase material having the binary composite dispersed therein in an amount sufficient to generate a continuous conductive network in the major phase material and form a conductive ternary composite having distinct co-continuous phases.

17. The cable of claim 16, wherein the electrical conductivity of the conductive ternary composite undergoes a predetermined change when exposed to the at least one analyte.

18. The cable of claim 16, wherein the conductive ternary composite is crosslinked.

19. The cable of claim 16, wherein the jacket is the polymer composite, the polymer composite having a predetermined tensile strength and a predetermined moisture impermeability.

20. The cable of claim 16, wherein the minor phase material has a solubility parameter $\delta_A$ and the major phase material has a solubility parameter $\delta_B$ and wherein the conductive ternary composite has distinct co-continuous phases which meet the following criteria for immiscibility, $7 \geq (\delta_A - \delta_B)^2 \geq 0$.

21. The cable of claim 16, wherein the immiscible polymer blend further comprises:
at least one second major phase material having an affinity for at least one second analyte, wherein the conductive ternary composite is dispersed in an amount sufficient to generate a continuous conductive network in the second major phase material and form a conductive quaternary composite having distinct co-continuous phases, wherein the at least one second major phase material is selected from that group of polymers which when mixed with the conductive ternary composite will not engage in electrostatic interactions that promote miscibility with the minor phase material or the major phase material.

22. The cable of claim 21, wherein the electrical conductivity of the conductive quatenary composite undergoes a predetermined change when exposed to the at least one second analyte.

23. The cable of claim 22, wherein the immiscible polymer blend further comprises one or more additional major phase materials, each of said additional major phase materials being polymers having an affinity for at least one additional analyte, said additional major phase materials being polymers which when mixed with each other, with the major phase material, with the second major phase material and with the minor phase material will not engage in electrostatic interactions that promote miscibility and will form a conducting multi-phase composite having distinct co-continuous phases, wherein the electrical conductivity of the conducting multi-phase composite undergoes a change when exposed to one of the at least one additional analyte.

24. A cable for conveying energy and having a longitudinal axis, the cable comprising:
a longitudinally extending core including at least one longitudinally extending energy conveying medium;
a longitudinally extending outer jacket encircling the core and having an inner peripheral surface and an outer peripheral surface spaced from said inner peripheral surface; and
at least one longitudinally extending electrochemical sensor for detecting the presence of chemical analytes, wherein the sensor is disposed outside the core but not further from said axis than a position at the outer surface of the jacket, wherein the sensor is longitudinally continuous and substantially longitudinally co-extensive with the jacket, wherein the sensor comprises an electrically conductive polymer composite having electrical properties which undergo a change when exposed to at least one analyte, and wherein the conductive polymer composite is an extrudable immiscible polymer blend comprising:
a conductive filler material;
a minor phase material in which the conductive filler material is dispersed in an amount sufficient to generate a continuous conductive network in the minor phase material and form a binary composite; and
a major phase material with an affinity for the at least one chemical analyte, wherein the major phase material is a polymer which when mixed with the binary composite will not engage in electrostatic interactions that promote miscibility, the major phase material having the binary composite dispersed therein in an amount sufficient to generate a continuous conductive network in the major phase material and form a conductive ternary composite having distinct co-continuous phases.

25. The cable of claim 24, wherein the electrical conductivity of the conductive ternary composite undergoes a predetermined change when exposed to the at least one analyte.

26. The cable of claim 24, wherein the sensor is for detecting the presence of chemical analytes in contact with the jacket.

27. The cable of claim 24, wherein the sensor is not energy coupled to the energy conveying medium.

28. The cable of claim 24, wherein the conductive ternary composite is crosslinked.

29. The cable of claim 24, wherein the immiscible polymer blend further comprises:
at least one second major phase material having an affinity for at least one second analyte, wherein the conductive ternary composite is dispersed in an amount sufficient to generate a continuous conductive network in the second major phase material and form a conductive quaternary composite having distinct co-continuous phases, wherein the at least one second major phase material is selected from that group of polymers which when mixed with the conductive ternary composite will not engage in electrostatic interactions that promote miscibility with the minor phase material or the major phase material.

30. The cable of claim 29, wherein the electrical conductivity of the conductive quatenary composite undergoes a predetermined change when exposed to the at least one second analyte.

31. The cable of claim 24, wherein the energy conveying medium is at least one optical fiber.

32. The cable of claim 24, wherein the energy conveying medium is at least one electrical conductor.

33. The cable of claim 29, wherein the immiscible polymer blend further comprises one or more additional major phase materials, each of said additional major phase materials being polymers having an affinity for at least one additional analyte, said additional major phase materials being polymers which when mixed with each other, with the major phase material, with the second major phase material and with the minor phase material will not engage in electrostatic interactions that promote miscibility and will form a conducting multi-phase composite having distinct co-continuous phases, wherein the electrical conductivity of the conducting multi-phase composite undergoes a change when exposed to one of the at least one additional analyte.

34. A system for detecting the presence of a chemical analyte at any point along the length of the exterior of a longitudinally extending energy conveying cable having a core with an energy conveying medium encircled by insulation, the core being encircled by a jacket having inner and outer peripheral surfaces, the system comprising:

at least one longitudinally extending electrochemical sensor for detecting the presence of chemical analytes, wherein the sensor is outside the core, extends peripherally about the core without surrounding the core, is not energy coupled to the energy conveying medium, and comprises an electrically conductive polymer composite having predetermined electrical properties which undergo a change when exposed to at least one analyte; and measuring means coupled to the sensor for detecting a change in the electrical properties of the conductive polymer composite.

35. The system of claim 34, wherein the sensor is for detecting the presence of chemical analytes in contact with the jacket, is secured to the jacket and is longitudinally continuous and substantially longitudinally co-extensive with the jacket.

36. The system of claim 34, wherein the measuring means is coupled to the sensor at an end of the cable.

37. The system of claim 35, wherein the one sensor is disposed at the outer surface of the jacket and further comprising another electrochemical sensor with a conductive polymer composite for detecting the presence of chemical analytes in the jacket, wherein the another sensor is spaced from the one sensor and disposed at the inner surface of the jacket and wherein the measuring means is coupled to the another sensor for detecting a change in the electrical properties of the another sensor.

38. A cable for conveying energy and having a longitudinal axis, the cable comprising:

a longitudinally extending core including at least one longitudinally extending energy conveying medium;

a longitudinally extending outer jacket encircling the core and having an inner surface and an outer surface, defining, respectively, nominal inner and outer peripheries of the outer jacket, the inner surface being spaced from said outer surface and nearer said axis than said outer surface; and at least one longitudinally extending electrochemical sensor for detecting the presence of chemical analytes in contact with the jacket, wherein the sensor is part of the jacket, longitudinally continuous and substantially longitudinally co-extensive with the jacket and comprises an electrically conductive polymer composite having predetermined electrical properties which undergo a change when exposed to at least one analyte.

39. A system for detecting the presence of a chemical analyte at any point along the length of the exterior of a longitudinally extending energy conveying cable having a core with an energy conveying medium encircled by insulation, the core being encircled by a jacket having inner and outer peripheral surfaces, the system comprising:

at least one longitudinally extending electrochemical sensor for detecting the presence of chemical analytes in contact with the jacket, wherein the sensor is secured to the jacket, extends peripherally about the core without surrounding the core, is longitudinally continuous and substantially longitudinally co-extensive with the jacket and comprises an electrically conductive polymer composite having predetermined electrical properties which undergo a change when exposed to at least one analyte; and measuring means coupled to the sensor for detecting a change in the electrical properties of the conductive polymer composite.

40. A cable for conveying energy and having a longitudinal axis, the cable comprising:

a longitudinally extending core including at least one longitudinally extending energy conveying medium;

a longitudinally extending outer jacket encircling the core and having an inner surface and an outer surface, defining, respectively, nominal inner and outer peripheries of the outer jacket, the inner surface being spaced from said outer surface and nearer said axis than said outer surface; and at least one longitudinally extending electrochemical sensor for detecting the presence of chemical analytes in contact with the jacket, wherein the sensor is outside the core, part of the jacket, longitudinally continuous and substantially longitudinally co-extensive with the jacket, and not energy coupled to the energy conveying medium, wherein the sensor comprises an electrically conductive polymer composite having predetermined electrical properties which undergo a change when exposed to at least one analyte.

41. The cable of claim 40, wherein the jacket is a plastic jacket the plastic of which is selected to bond with the polymer of the composite.

42. The cable of claim 40, wherein the electrically conductive polymer composite has predetermined electrical properties which undergo a reversible change when exposed to at least one analyte.

43. A cable for conveying energy and having a longitudinal axis, the cable comprising:

a longitudinally extending core including at least one longitudinally extending energy conveying medium;

a longitudinally extending outer jacket encircling the core and having an inner surface and an outer surface, defining, respectively, nominal inner and outer peripheries of the outer jacket, the inner surface being spaced from said outer surface and nearer said axis than said outer surface; and at least one longitudinally extending electrochemical sensor for detecting the presence of chemical analytes, wherein the sensor is outside the core, not energy coupled to the energy conveying medium, and in the form of a stripe having a dimension circumferentially of said axis which is small relative to the dimension of the outer periphery of the jacket, wherein the stripe is embedded in the jacket intermediate the inner and outer surfaces of the jacket and spaced from at least one of the inner and outer surfaces of the jacket, and wherein the sensor comprises an electrically conductive polymer composite having predetermined electrical properties which undergo a change when exposed to at least one analyte.

44. The cable of claim 43, wherein the stripe has a surface substantially co-extensive with the outer surface of the jacket.

45. The cable of claim 43, wherein the stripe has a surface substantially co-extensive with the inner surface of the jacket.

46. The cable of claim 43, wherein the electrically conductive polymer composite has predetermined electrical properties which undergo a reversible change when exposed to at least one analyte.

47. A cable for conveying energy and having a longitudinal axis, the cable comprising:

a longitudinally extending core including at least one longitudinally extending energy conveying medium;

a longitudinally extending outer jacket encircling the core and having an inner surface and an outer surface, defining, respectively, nominal inner and outer peripheries of the outer jacket, the inner surface being spaced from said outer surface and nearer said axis than said outer surface; and a plurality of longitudinally extending electrochemical sensors for detecting the presence of chemical analytes, wherein each of the sensors is outside the core and is not energy coupled to the energy conveying medium and comprises an electrically conductive polymer composite having predetermined electrical properties which undergo a change when exposed to at least one analyte, wherein each of the sensors has a dimension radially of said axis which is less than the spacing between said inner and outer surfaces of the jacket and wherein at least one of the sensors has a surface substantially co-extensive with the outer surface of the jacket and at least another of the sensors has a surface substantially co-extensive with the inner surface of the jacket.

48. The cable of claim 47, wherein the sensors lie on lines extending radially of said axis and each sensor which has a surface substantially co-extensive with the outer surface of the jacket lies on the same radial line as another sensor having a surface substantially co-extensive with the inner surface of the jacket.

49. The cable of claim 47, wherein the electrically conductive polymer composite of at least one of the sensors has predetermined electrical properties which undergo a reversible change when exposed to at least one analyte.

50. A cable for conveying energy and having a longitudinal axis, the cable comprising:

a longitudinally extending core including at least one longitudinally extending energy conveying medium;

a longitudinally extending outer jacket encircling the core and having an inner surface and an outer surface, defining, respectively, nominal inner and outer peripheries of the outer jacket, the inner surface being spaced from said outer surface and nearer said axis than said outer surface; and a plurality of longitudinally extending electrochemical sensor for detecting the presence of chemical analytes, wherein each of the sensors is outside the core and is not energy coupled to the energy conveying medium and comprises an electrically conductive polymer composite having predetermined electrical properties which undergo a change when exposed to at least one analyte, wherein each of the sensors has a dimension radially of said axis which is less than the spacing between said inner and outer surfaces of the jacket and wherein the polymer composite of at least one of the sensors undergoes a change of electrical properties when exposed to a first chemical analyte and the polymer composite of at least one other sensor undergoes a change of electrical properties when exposed to a second, different chemical analyte.

51. The cable of claim 50, wherein the electrically conductive polymer composite of at least one of the sensors has predetermined electrical properties which undergo a reversible change when exposed to at least one analyte.

52. A cable for conveying energy and having a longitudinal axis, the cable comprising:

a longitudinally extending core including at least one longitudinally extending energy conveying medium;

a longitudinally extending outer jacket encircling the core and having an inner surface and an outer surface, defining, respectively, nominal inner and outer peripheries of the outer jacket, the inner surface being spaced from said outer surface and nearer said axis than said outer surface; and at least one longitudinally extending electrochemical sensor for detecting the presence of chemical analytes, wherein the sensor is outside the core, in the form of a helix extending around said axis and not energy coupled to the energy conveying medium, and wherein the sensor comprises an electrically conductive polymer composite having predetermined electrical properties which undergo a change when exposed to at least one analyte.

53. The cable of claim 52, wherein the electrically conductive polymer composite has predetermined electrical properties which undergo a reversible change when exposed to at least one analyte.

54. A cable for conveying energy and having a longitudinal axis, the cable comprising:

a longitudinally extending core including at least one longitudinally extending optical fiber;

a longitudinally extending outer jacket encircling the core and having an inner surface and an outer surface, defining, respectively, nominal inner and outer peripheries of the outer jacket, the inner surface being spaced from said outer surface and nearer said axis than said outer surface; and at least one longitudinally extending electrochemical sensor for detecting the presence of chemical analytes, wherein the sensor is outside the core and is not energy coupled to the optical fiber and comprises an electrically conductive polymer composite having predetermined electrical properties which undergo a change when exposed to at least one analyte.

55. The cable of claim 54, wherein the electrically conductive polymer composite has predetermined electrical properties which undergo a reversible change when exposed to at least one analyte.

56. A cable for conveying energy and having a longitudinal axis, the cable comprising:

a longitudinally extending core including at least one longitudinally extending energy conveying medium;

a longitudinally extending outer jacket encircling the core and having an inner surface and an outer surface, defining, respectively, nominal inner and outer peripheries of the outer jacket, the inner surface being spaced from said outer surface and nearer said axis than said outer surface;

at least one longitudinally extending electrochemical sensor for detecting the presence of chemical analytes, wherein the sensor is outside the core and is not energy coupled to the energy conveying medium and comprises an electrically conductive polymer composite having predetermined electrical properties which undergo a change when exposed to at least one analyte; and wherein the conductive polymer composite is an extrudable immiscible polymer blend comprising:

a conductive filler material;

a minor phase material in which the conductive filler material is dispersed in an amount sufficient to generate a continuous conductive network in the minor phase material and form a binary composite; and a major phase material with an affinity for the at least one chemical analyte, wherein the major phase material is a polymer which when mixed with the binary composite will not engage in electrostatic interactions that promote miscibility, the major phase material having the binary composite dispersed therein in an amount sufficient to generate a continuous conductive network in the major phase material and form a conductive ternary composite having distinct co-continuous phases.

57. The cable of claim 56, wherein the electrical conductivity of the conductive ternary composite undergoes a predetermined change when exposed to the at least one analyte.

58. The cable of claim 56, wherein the conductive ternary composite is crosslinked.

59. The cable of claim 56, wherein the jacket is the polymer composite, the polymer composite having a predetermined tensile strength and a predetermined moisture impermeability.

60. The cable of claim 56, wherein the minor phase material has a solubility parameter $\delta_A$ and the major phase material has a solubility parameter $\delta_B$ and wherein the conductive ternary composite has distinct co-continuous phases which meet the following criteria for immiscibility, $7 \geq (\delta_A - \delta_B)^2 \geq 0$.

61. The cable of claim 56, wherein the immiscible polymer blend further comprises:

at least one second major phase material having an affinity for at least one second analyte, wherein the conductive ternary composite is dispersed in an amount sufficient to generate a continuous conductive network in the second major phase material and form a conductive quaternary composite having distinct co-continuous phases, wherein the at least one second major phase material is selected from that group of polymers which when mixed with the conductive ternary composite will not engage in electrostatic interactions that promote miscibility with the minor phase material or the major phase material.

62. The cable of claim 61, wherein the electrical conductivity of the conductive quatenary composite undergoes a predetermined change when exposed to the at least one second analyte.

63. The cable of claim 62, wherein the immiscible polymer blend further comprises one or more additional major phase materials, each of said additional major phase materials being polymers having an affinity for at least one additional analyte, said additional major phase materials being polymers which when mixed with each other, with the major phase material, with the second major phase material and with the minor phase material will not engage in electrostatic interactions that promote miscibility and will form a conducting multi-phase composite having distinct co-continuous phases, wherein the electrical conductivity of the conducting multi-phase composite undergoes a change when exposed to one of the at least one additional analyte.

64. The cable of claim 56, wherein the electrically conductive polymer composite of at least one of the plurality of the sensors has predetermined electrical properties which undergo a reversible change when exposed to at least one analyte.

65. A system for detecting the presence of a chemical analyte at any point along the length of the exterior of a longitudinally extending energy conveying cable having a core with an energy conveying medium encircled by a jacket having inner and outer peripheral surfaces, the system comprising:

a plurality of longitudinally extending electrochemical sensors for detecting the presence of chemical analytes in contact with the jacket, wherein each of the sensors is outside the core, secured to the jacket, longitudinally continuous and substantially longitudinally co-extensive with the jacket, and not energy coupled to the energy conveying medium, wherein each the sensors comprises an electrically conductive polymer composite having predetermined electrical properties which undergo a change when exposed to at least one analyte, and wherein a first sensor of the plurality of sensors is disposed at the outer surface of the jacket and a second sensor of the plurality of sensors is spaced from the first sensor and disposed at the inner surface of the jacket; and measuring means coupled to at least the first and second sensors for detecting a change in the electrical properties of the conductive polymer composite in the first and second sensors, respectively.

66. The system of claim 65, wherein the electrically conductive polymer composite of at least one of the plurality of the sensors has predetermined electrical properties which undergo a reversible change when exposed to at least one analyte.

* * * * *